Patented Jan. 27, 1925.

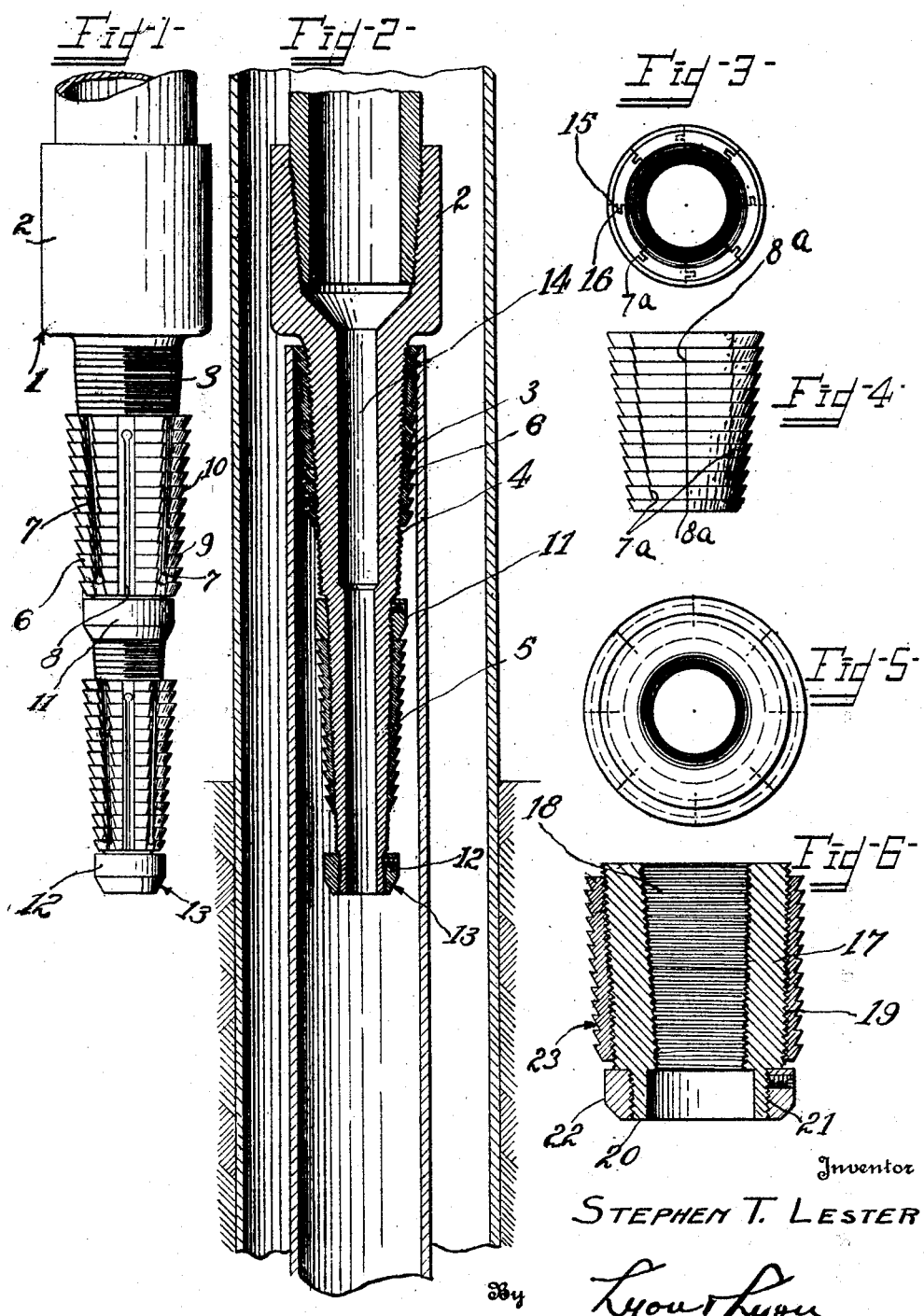

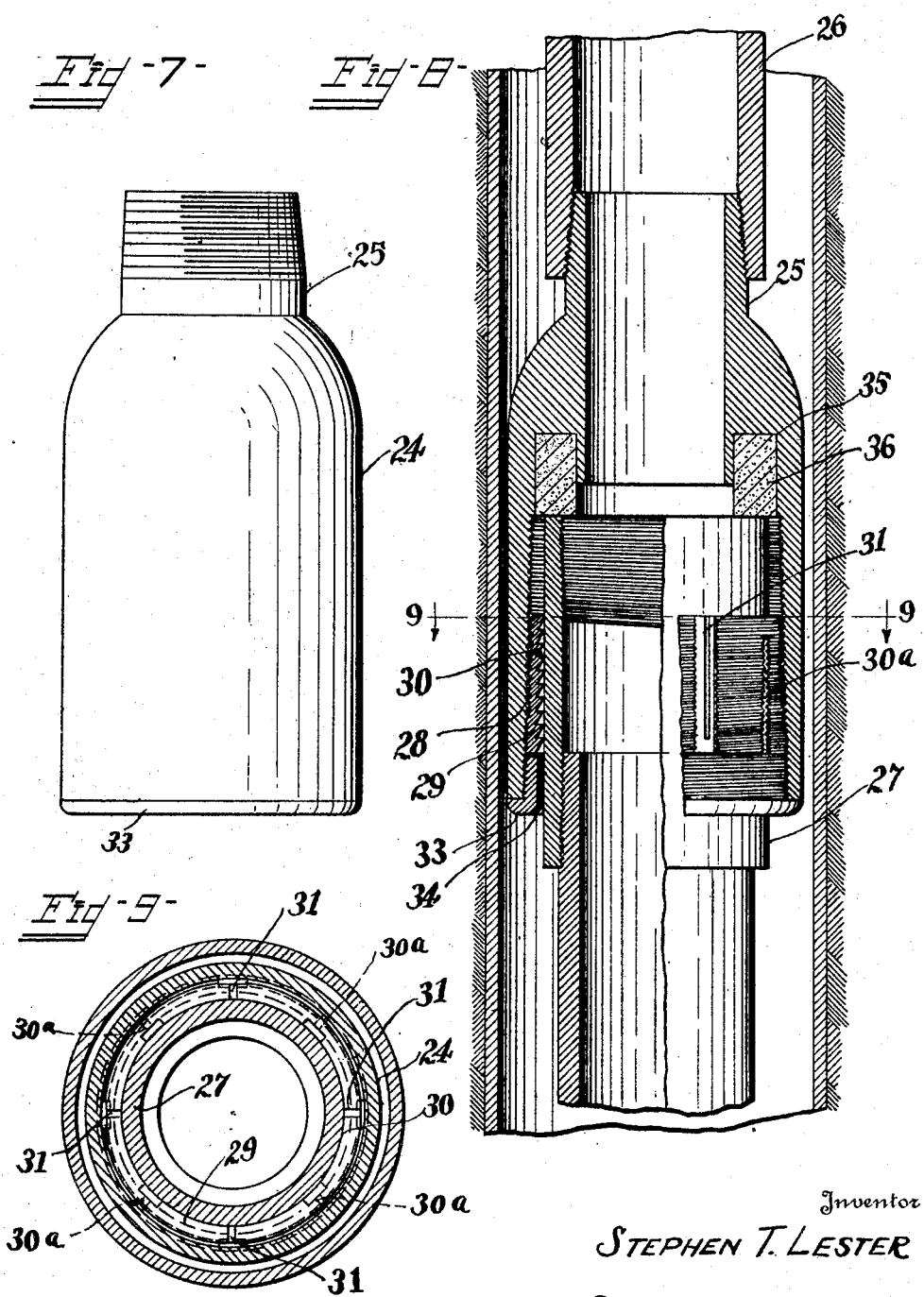

1,524,265

UNITED STATES PATENT OFFICE.

STEPHEN T. LESTER, OF VENTURA, CALIFORNIA.

CONNECTING DEVICE SUCH AS TAP AND DIE COLLAR.

Application filed August 4, 1923. Serial No. 655,750.

*To all whom it may concern:*

Be it known that I, STEPHEN T. LESTER, a citizen of the United States, residing at Ventura, in the county of Ventura, State of California, have invented new and useful Connecting Devices Such as Taps and Die Collars, of which the following is a specification.

This invention relates to a device intended for use in gripping and holding certain devices or tools, and refers particularly to a fishing device, such as a tap or die collar which may be employed for recovering certain tools, such as drill pipe, casing, etc., from wells.

Heretofore, certain fishing taps and die collars have been employed in the oil well drilling art for recovering tools broken off and lodged in the well. As commonly constructed these fishing taps have been formed with the jaws integral and rigid with the body of the spear. Thus, when the spears are employed in recovering tools from oil wells, it is impossible to expand such jaws and for this reason it is frequently difficult to properly engage the tap with the tool and withdraw the same from the well. Similarly, the die collars generally employed do not properly contract onto the tool to be withdrawn from the well.

An object of this invention is to provide a fishing device such as tap or spear with a slip member which may be expanded upon the body of the tap when the tap engages a tool and thus the slip member is firmly wedged and screwed into the tool to be removed or such as a die collar with a slip member which may contract upon the body of the collar when engaging a tool and thus be firmly wedged and screwed over the tool to be removed.

Another object of this invention is to provide a fishing device such as tap or die collar with a replaceable slip member so that upon wear of the jaws or teeth of the slip member a new member may be supplied to the fishing device.

Another object of this invention is to provide a novel form of fishing device having a number of different sized slip members supported upon the body, each of which slip members is constructed to expand or contract during the fishing operation so that such different sized expansible slip members may be simultaneously lowered into the well, and thus the device adapted to engage a variety of sizes of openings in the tool. This is an important advantage in many fishing operations, since the diameter of the opening at the top of the tool to be removed may not be known, and thus the fishing device cannot engage the same unless it is constructed to engage a large variety of openings. Moreover, a fishing device is thus provided which may be of greater general utility and adapted to recover a larger variety of tools lodged in the well.

Another object of this invention is to provide a novel form of expansible slip member for use in fishing taps, die collars, or similar devices which slip member is provided with an arrangement of slits to permit the member to expand with lugs extending from one side of each of the slits and loosely engaging a corresponding recess in the opposed side of each slit so that during the expansion of the slip member the lugs may be slid partially out of the recesses engaging the same and still be in position to engage the opposed side of the slit and operate to hold the slip member together during such expanding operation.

Other objects and advantages of this invention will be apparent from a description hereinafter contained, wherein there is described a preferred embodiment or method of embodiment of the invention.

Reference is made to the accompanying drawings, in which

Figure 1 is a vertical elevation of a fishing tap embodying the invention.

Fig. 2 is a vertical section of Fig. 1, illustrating the device in position in a well casing and engaging the pipe to be removed from the casing.

Figs. 3 and 4 illustrate the preferred form of the slip members to be employed with the fishing tap, in which Fig. 3 is a plan view and Fig. 4 is an elevation.

Figs. 5 and 6 illustrate a bushing externally mounting a slip member of larger size than the slip members illustrated in Figs. 1 and 2, which bushing and enlarged slip member may be employed on the tap to enable the tap to engage a larger opening.

Fig. 5 being a plan view and

Fig. 6 being an elevation in vertical section.

Fig. 7 is a vertical elevation of a somewhat modified form of the invention or die collar in which the operation of the majority of the parts is reversed so that the die collar engages the exterior of the casing or device to be removed from the well.

Fig. 8 is an elevation in section of the die collar showing the same in place in a well casing and engaged with a casing which is to be removed from the well and connected at the top with a stand or drill pipe. The view is mainly in vertical section.

Fig. 9 is a section on the line 9—9 of Fig. 8.

In the drawings, the fishing tap comprises a body 1 provided with suitable means such as the threaded tool joint 2 for attachment with a string of tools. Below the tool joint 2 the body is provided with a stem 3 which is tapered downwardly and provided with two stepped portions 4 and 5, 4 being the upper portion and 5 the lower portion of the stem 3. Each portion of the stem 3 is externally threaded substantially throughout the length of the portion and serves to support a slip member 6, said slip members 6 being threaded around the portions 4 and 5. Each member 6 is provided with slits 7 extending from the top of the member partially down the sides and also with slits 8 extending from the bottom of the member partially up the sides of the member. Said slits 7 and 8 are staggered with relation to each other. The resulting arrangement of the slits 7 and 8 thus provides a slip member which may be screwed up upon the stem 3 of the body 1 and expand during such motion. Each of the slip members is provided on its outer surface with upwardly directed threaded teeth 10. The body 1 of the fishing tap is further provided with a duct or water passage 14 extending axially through the tap when the same is passing through muddy formations.

At the upper end of the lower portion 5 of the stem 3 a collar 11 is threaded to the stem, being thus in position to prevent the upper slip member 6 from screwing off or being forced off the portion 4 of the stem, and at the lower extremity of the stem 3 a second collar or lock nut 12 is threaded to the stem, said collar 12 serving to prevent the lower slip member from being screwed or forced off the stem.

The collar 12 is preferably provided with a downwardly tapered outer surface 13 which thus forms a guide at the lower end of the fishing tap for guiding the tap into the tool to be engaged.

Referring to Figs. 3 and 4 a preferred form of slip member is shown. Said member has the downwardly extending slits 7ª and the upwardly extending slits 8ª staggered around the slip member. From one edge of each of the slits in the member a lug 15 extends, preferably being continued substantially throughout the length of the member, and said lugs engage a corresponding recess 16 in the opposed edges of the slits. By this construction the lugs 15 serve to retain the slip member from being broken apart when the same is expanded. The lugs 15 during the expanding operation being slid partially from the recesses 16 but still being in position to engage the opposed side of the slit and thus strengthen the slip member. Such slip members may be formed by first forming a plurality of segments each having at one edge a lug 15 and at the opposite edge a recess 16. The sections are then joined together by welding alternate sections partially down from the top and likewise welding alternate sections partially up from the bottom, the top and bottom welded points being staggered so that the resulting slip member is formed in one rigid or integral piece.

Referring to Figs 5 and 6, I have illustrated an attachment for the fishing tap which may permit larger sizes of slip members to be employed upon the tap. Said attachment comprises a bushing 17 internally threaded as indicated at 18 to fit the upper section 4 of the fishing tap and is provided with downwardly tapering external threads 19 upon which a slip member 23 may be threaded. The lower end of the bushing 17 is provided with a reduced portion 20 which is externally threaded at 21, preferably in a direction reverse to the direction of the threads upon the outer surface of the bushing. Upon the reduced portion 20 of the bushing is threaded a collar 22 which is thus in position to prevent the enlarged slip member 23 from being screwed or forced from the bushing 17.

In use the fishing tap is lowered down the well upon a string of pipe. The lower collar 12 first contacts with the tool to be engaged guiding the fishing tap into the opening of the tool whereupon the tool is engaged by one of the slip members 6. Upon engagement with the tool the tap is rotated to remove the slip members upward upon the expanding stem 3 which causes the members to expand and be wedged into the tool to be removed, thus materially facilitating the removal of the broken tool from the well. The fishing tap being provided with stepped portions 4 and 5, and thus a number of expansible slip members of various external diameter, it is unnecessary to know the exact size of the opening in the tool to be removed. The passage 14 in the fishing tap permits the tap to be lowered through muddy formations by flushing water through the passage.

In the modified form of the invention illustrated in Figures 7 to 9, certain parts are reversed so as to form a die collar comprising a casing 24 provided with a threaded neck 25 at the top by which the die collar may be attached to a drill pipe such as 26. The casing 24 is mainly tubular in form and of the size sufficient to set over the pipe collar such as indicated at 27 or tool joint or other casing that is to be engaged by the tap. The interior of the casing 24 is tapered upwardly and threaded as indicated at 28.

29 indicates a slip member which is substantially similar in construction to the slip members employed on the embodiment of the invention shown in Figures 1 to 6, inclusive. In this case, however, the exterior of the slip member 29 is threaded to fit the inner threads 28 of the casing and the upward directed teeth or threads 30 are formed upon the interior of the slip member so that the same will be in position to engage the exterior of the drill collar or device to be removed from the well. The slip member 29 is provided with a slit 30$^a$ extending partially upward from the bottom end of the slip member and the slit 31 extending partially downward from the top end of the slip member so that the same may contract or expand. The slip member 29 is of less length than the threaded portion of the casing 24 so that the same may be moved upwardly along the inner tapered surface of the casing 24 and be thereby contracted about the collar 27 to be engaged, and firmly grip the same so that the same may be removed from the well. The lower end of the casing 24 is provided with a lock nut 33 shaped at the bottom 34 to form a guide.

Above the tapered threads 28 on the casing a recess 35 is formed in the casing 24 in which is placed annular packing material 36 which is intended to engage the collar of the pipe or other device being removed from the well and making an air-tight joint with the same.

In operation this embodiment of the invention is forced down over the collar 27 until the slip member 29 engages the exterior of the device to be removed from the well, such as the collar 27. The die collar is then rotated in a direction to cause the slip member 29 to move upwardly on the tapered threads 28 of the tap and thereby forcing the slip member 29 to contract around the collar 27 and firmly wedge the same in place. This operation likewise forces the collar 27 up against the packing member 36 and forms the desired air-tight joint. The die collar may then be withdrawn from the well to remove the pipe and during such operation water or flushing fluid may be forced through the die collar and pipe since the joint between the pipe and die collar is made air-tight and which will thus facilitate the fishing operation. If, for any reason it is necessary to disengage the die collar from the pipe after the same is engaged with the collar 27 the die collar is rotated in the direction which causes the slip member 29 to move downwardly in the die collar, thus being expanded and released from engagement with the collar 27.

While I have shown a preferred embodiment or method of embodiment of this invention, the invention is not limited to the specific construction of the parts illustrated, but various changes may be made within the spirit of the invention. This invention is of the scope set forth in the appended claims.

I claim:

1. A slip member having longitudinal slits with lugs projecting from one side of the slits and engaging recesses in the opposed side of the slit said slits extending partially downwardly and partially upwardly and being arranged to permit the member to expand, said slits being staggered and extending so that the ends overlap throughout a substantial portion of their length to permit substantially the entire slit member to expand.

2. A device of the class described comprising a body having a threaded stem downwardly directed and contracting in the downward direction, said stem having stepped portions, and a slip member mounted on each step portion, said slip members having slits extending partially downward and partially upward being arranged to permit the members to expand.

3. A device of the class described comprising a body having a threaded section, a water duct extending through the section, and a slip member threaded on the section, said member having slits extending from the lower end partially upward and slits extending from the upper end partially downward.

Signed at Los Angeles, California, this 27th day of July, 1923.

STEPHEN T. LESTER.